US012782217B2

(12) United States Patent
Yamasaki et al.

(10) Patent No.: US 12,782,217 B2
(45) Date of Patent: Nov. 3, 2026

(54) PRESSURE SENSOR

(71) Applicant: Hitachi High-Tech Corporation, Tokyo (JP)

(72) Inventors: Tatsuya Yamasaki, Tokyo (JP); Takanori Aono, Tokyo (JP); Masatoshi Kanamaru, Tokyo (JP); Yoichiro Suzuki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 332 days.

(21) Appl. No.: 18/291,964

(22) PCT Filed: Jul. 22, 2022

(86) PCT No.: PCT/JP2022/028419
§ 371 (c)(1),
(2) Date: Jan. 25, 2024

(87) PCT Pub. No.: WO2023/026731
PCT Pub. Date: Mar. 2, 2023

(65) Prior Publication Data
US 2024/0353278 A1 Oct. 24, 2024

(30) Foreign Application Priority Data
Aug. 26, 2021 (JP) ................................ 2021-137759

(51) Int. Cl.
*G01L 9/00* (2006.01)

(52) U.S. Cl.
CPC .................................. *G01L 9/0048* (2013.01)

(58) Field of Classification Search
CPC . G01L 9/0048; G01L 9/0052; G01L 19/0023; G01L 19/04; G01L 19/147
See application file for complete search history.

(56) References Cited

U.S. PATENT DOCUMENTS 5,184,107 A 2/1993 Maurer
2002/0062697 A1* 5/2002 Yamagishi .......... G01L 19/0084 73/715

(Continued)

FOREIGN PATENT DOCUMENTS

DE 198 30 538 A1 1/2000
DE 10 2019 216 485 A1 4/2021

(Continued)

OTHER PUBLICATIONS

JP-2003083828-A (Year: 2003).*

(Continued)

*Primary Examiner* — Fatemeh Esfandiari Nia
(74) *Attorney, Agent, or Firm* — Crowell & Moring LLP

(57) ABSTRACT

A pressure sensor includes a sensor housing including an opening portion having different dimensions in a longitudinal direction and a transverse direction, a sensor chip that is provided on the sensor housing in a manner of closing the opening portion and that forms a diaphragm portion, a strain gauge portion provided in the sensor chip, and a cap member bonded to the sensor chip by a cap bonding agent. Among bonding surfaces of the cap bonding agent, bonding surfaces at both longitudinal direction end portions of the diaphragm portion each have a bonding area larger than that of bonding surfaces at both transverse direction end portions of the diaphragm portion. Accordingly, it is possible to prevent breakage or the like of the diaphragm portion in the pressure sensor and to maintain pressure detection sensitivity.

5 Claims, 7 Drawing Sheets

(56) References Cited

U.S. PATENT DOCUMENTS

| | | | | |
|---|---|---|---|---|
| 2005/0081638 | A1* | 4/2005 | Couch | G01L 9/0042 73/716 |
| 2015/0068315 | A1 | 3/2015 | Davis et al. | |
| 2015/0362391 | A1* | 12/2015 | Suzuki | G01L 19/04 137/511 |
| 2016/0313199 | A1* | 10/2016 | Kazama | G01L 19/0084 |
| 2017/0343438 | A1* | 11/2017 | Brown | G01L 13/025 |
| 2018/0010975 | A1* | 1/2018 | Seto | G01L 9/0055 |
| 2018/0252606 | A1 | 9/2018 | Kishimoto | |
| 2020/0393273 | A1 | 12/2020 | Sitz et al. | |

FOREIGN PATENT DOCUMENTS

| | | | | | |
|---|---|---|---|---|---|
| JP | 2001-337103 | A | | 12/2001 | |
| JP | 2003083828 | A | * | 3/2003 | |
| JP | 2012247391 | A | * | 12/2012 | |
| JP | 2013024670 | A | * | 2/2013 | |
| JP | 2014-55868 | A | | 3/2014 | |
| JP | 2014055868 | A | * | 3/2014 | |
| JP | 3207123 | U | | 10/2016 | |
| JP | 2018-146318 | A | | 9/2018 | |
| JP | 6621854 | B2 | * | 12/2019 | G01L 19/14 |
| JP | 2021-514056 | A | | 6/2021 | |
| WO | WO-2019123853 | A1 | * | 6/2019 | H10D 48/50 |

OTHER PUBLICATIONS

JP-2012247391-A (Year: 2012).*

JP-2013024670-A (Year: 2013).*

JP-2014055868-A (Year: 2014).*

JP-6621854-B2 (Year: 2019).*

WO-2019123853-A1 (Year: 2019).*

International Search Report (PCT/ISA/210) issued in PCT Application No. PCT/JP2022/028419 dated Sep. 27, 2022 with English translation (4 pages).

Japanese-language Written Opinion (PCT/ISA/237) issued in PCT Application No. PCT/JP2022/028419 dated Sep. 27, 2022 with English translation (7 pages).

Partial Supplementary European Search Report issued in European Application No. 22861022.6 dated Jul. 1, 2025 (12 pages).

* cited by examiner

[FIG. 1]
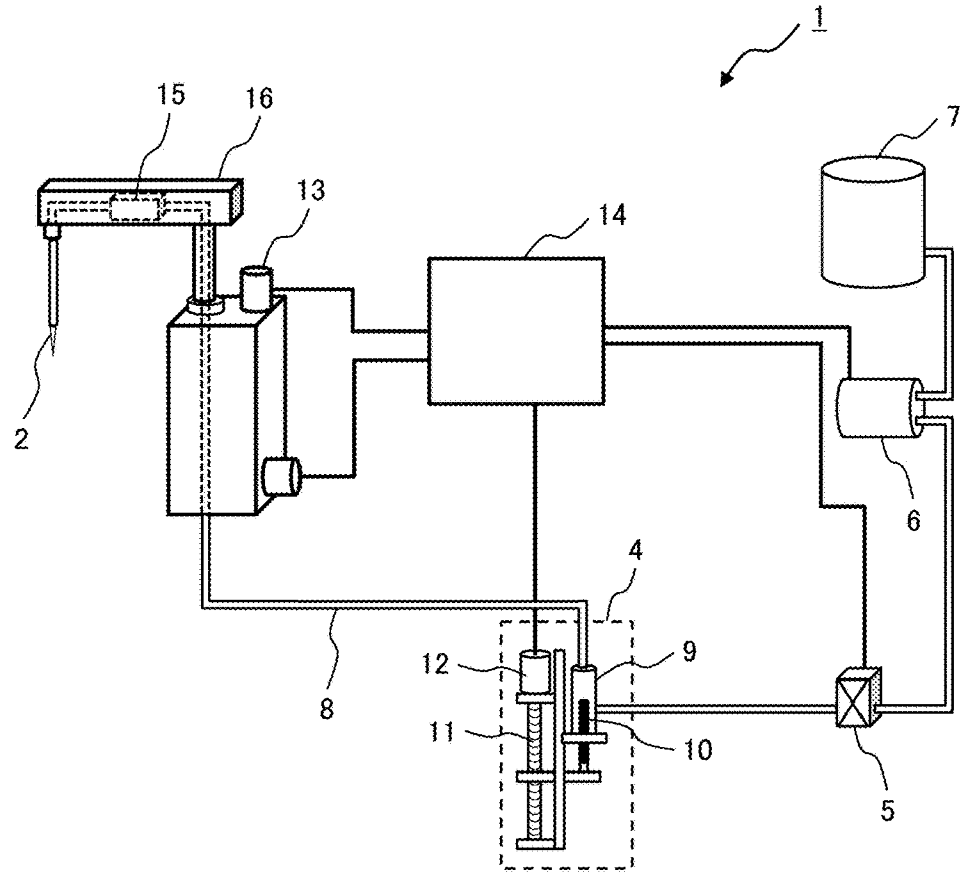
[FIG. 2]
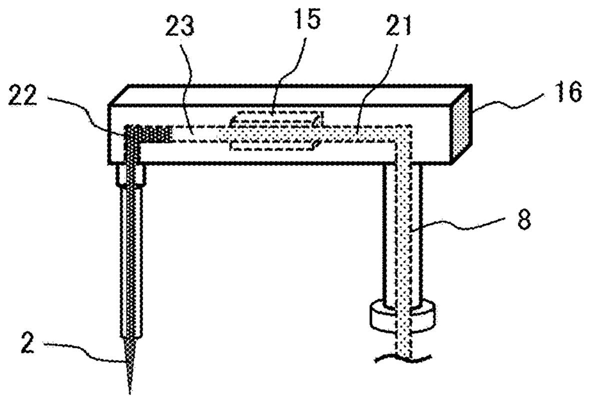

[FIG. 3A]
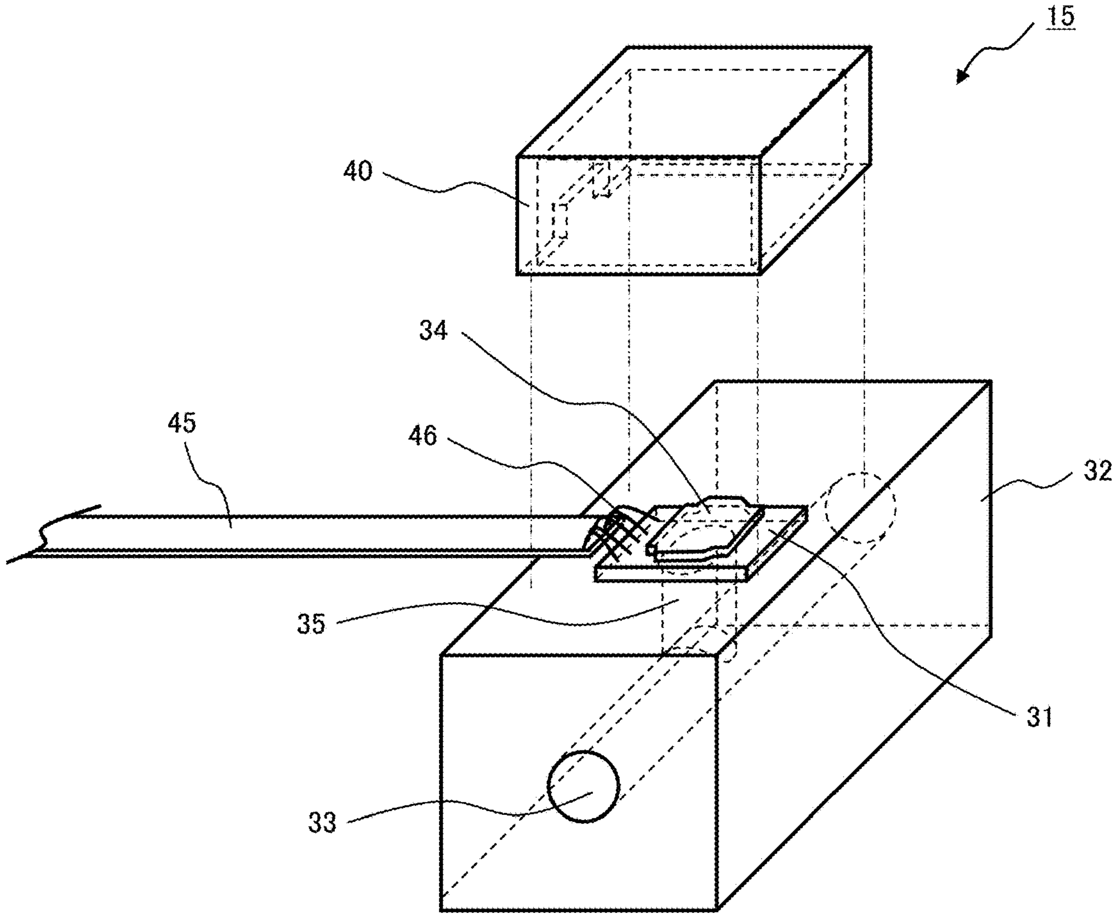
[FIG. 3B]
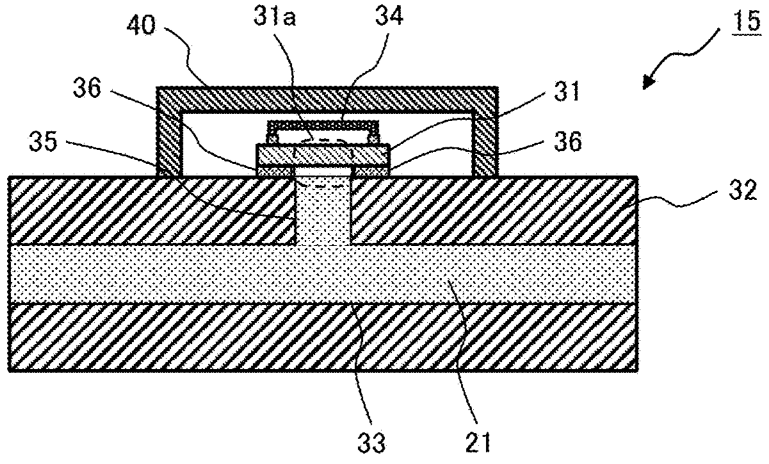

[FIG. 4]
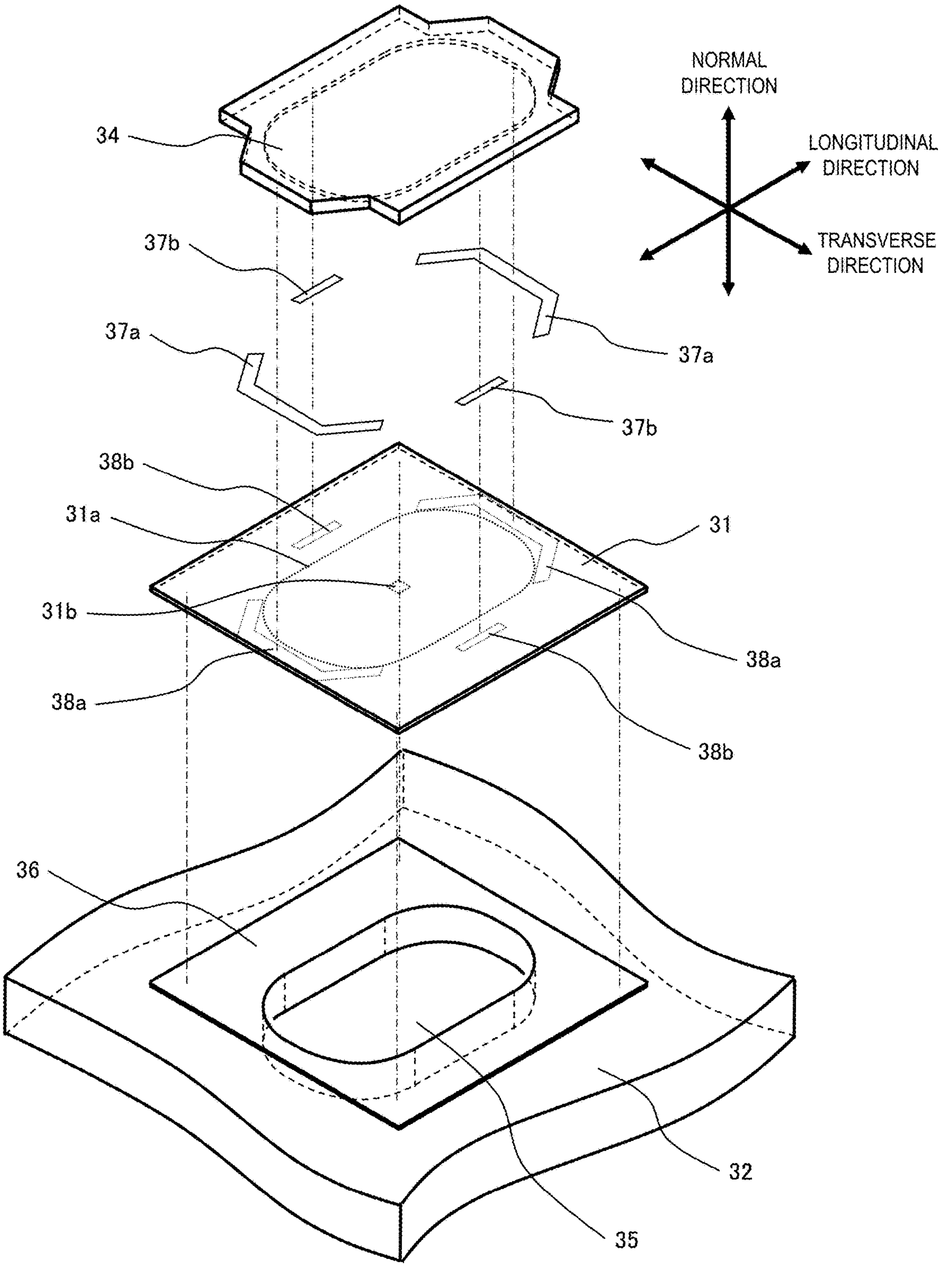

[FIG. 5A]
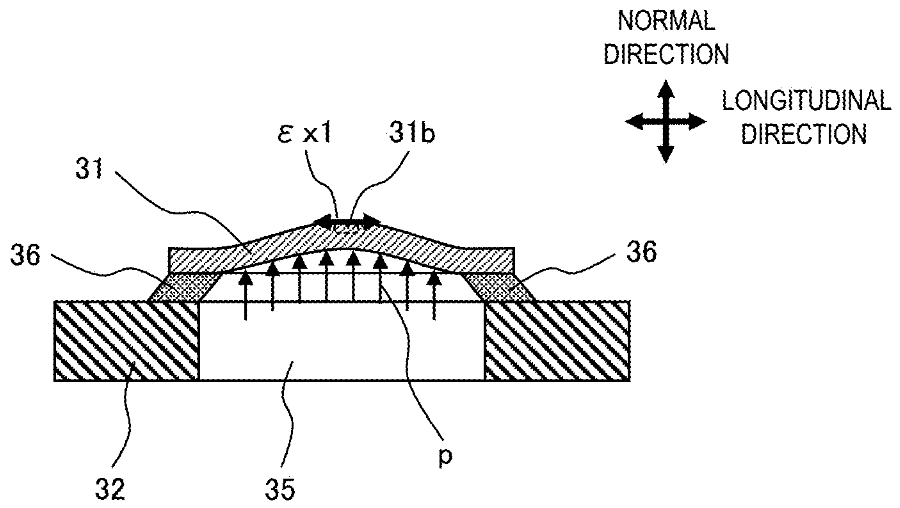
[FIG. 5B]
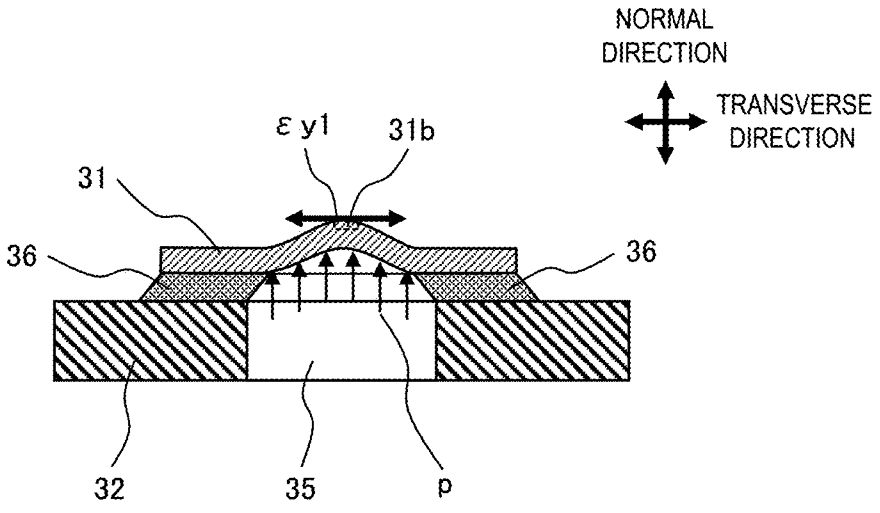

[FIG. 6A]
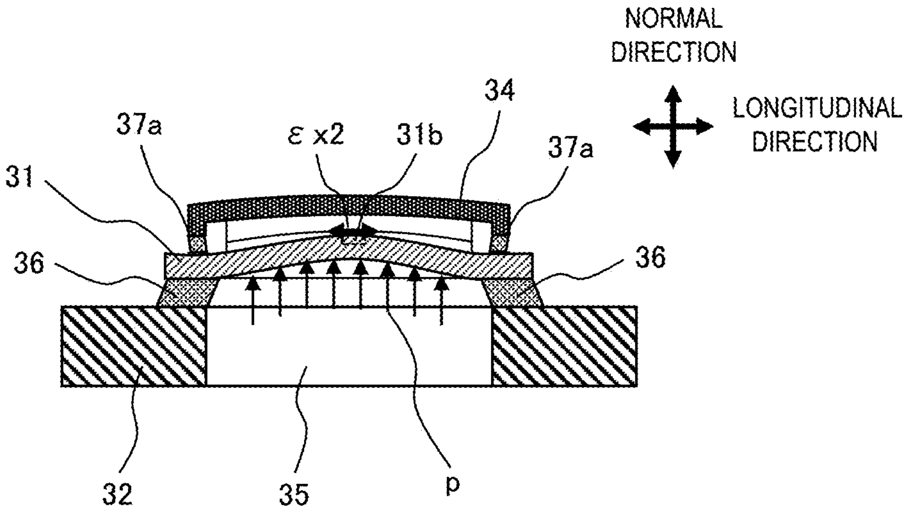
[FIG. 6B]
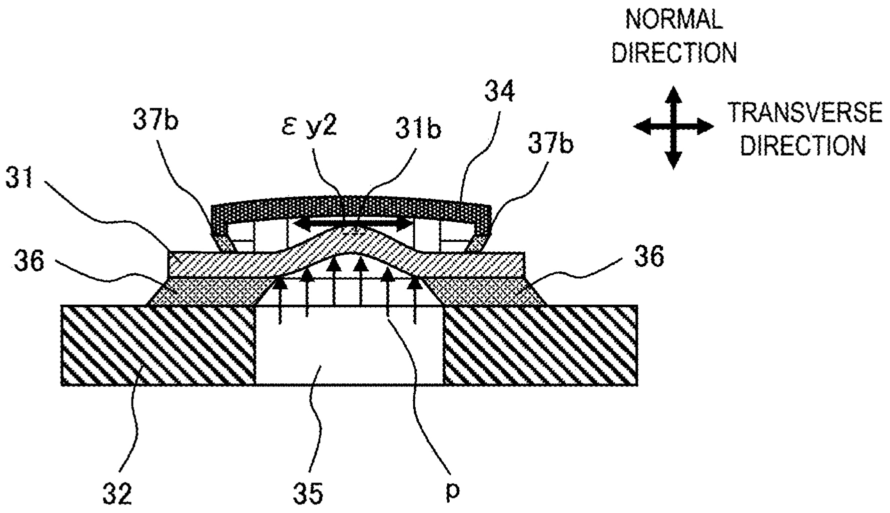

[FIG. 7]
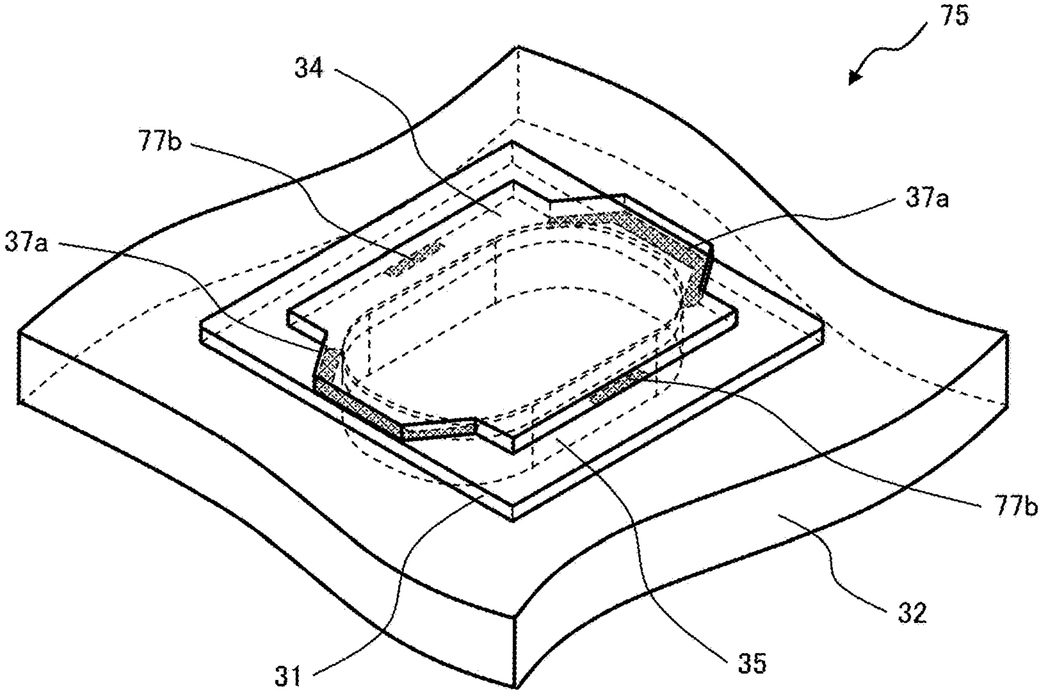
[FIG. 8]
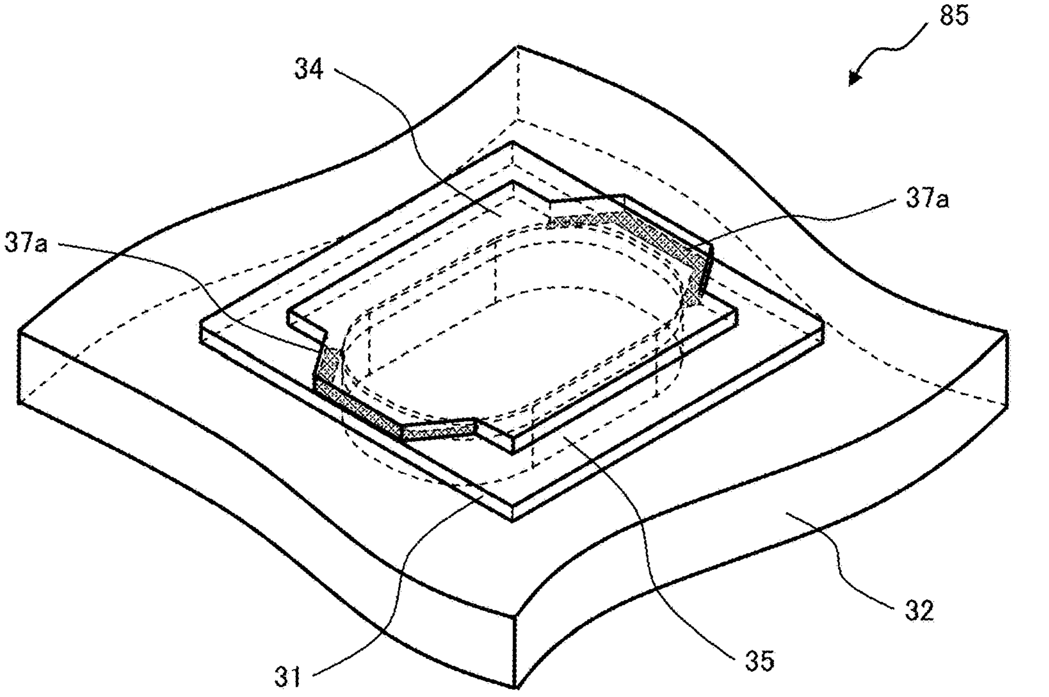

[FIG. 9]
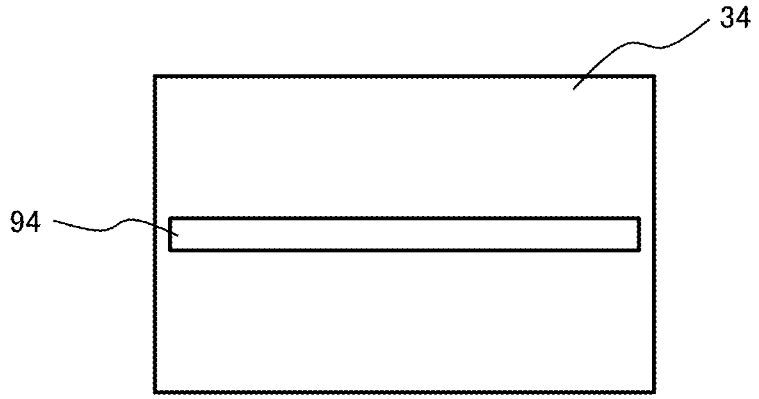
[FIG. 10]
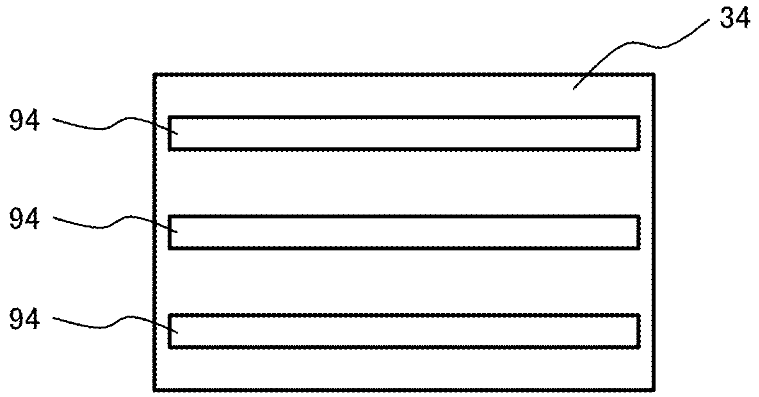

PRESSURE SENSOR

TECHNICAL FIELD

The present invention relates to a pressure sensor.

BACKGROUND ART

A pressure sensor using a piezoelectric element or the like is used in various fields.

For example, JP2018-146318A (PTL 1) discloses a semiconductor differential pressure sensor that is attached to a gasoline tank of an automobile and that is used for detecting a change in a pressure of gasoline vapor in a fuel tank system. PTL 1 discloses that a pressure detection element of the semiconductor differential pressure sensor has a main surface fixed to a top portion of a first protruding portion by an adhesive in a state in which a second protruding portion is fitted into an opening portion, thereby obtaining a strong holding force and high positional accuracy of the pressure detection element, and discloses that the adhesive can be prevented from flowing into a first pressure introduction path and blockage of the first pressure introduction path can be prevented.

JP2014-055868A (PTL 2) discloses a sensor chip that is a plate-shaped member having a circular shape in a plan view, and that includes a diaphragm, a piezoelectric diffusion gauge formed on a surface of the diaphragm, an electrode for extracting an electric signal, a lead diffusion portion that electrically connects the piezoelectric diffusion gauge to the electrode, a silicon oxide film (protective film) formed to cover the piezoelectric diffusion gauge and the lead diffusion portion, and a cover member bonded to the sensor chip with at least a part of a surface of the silicon oxide film serving as a bonding surface.

CITATION LIST

Patent Literature

PTL 1: JP2018-146318A
PTL 2: JP2014-055868A

SUMMARY OF INVENTION

Technical Problem

In order to improve pressure detection sensitivity of a pressure sensor using a strain sensor, it is effective to reduce a thickness of a diaphragm of a strain detection portion to increase strain against a pressure. However, as a drawback of thickness reduction, strength of the diaphragm decreases, and there is a concern that handling performance at the time of manufacturing may decrease, a chip fracture may occur, and the like.

In order to solve this problem, it is effective to bond a cover member to a diaphragm for protection as described in PTL 2. However, since rigidity of the diaphragm is also increased by bonding the cover member, the pressure detection sensitivity decreases, and there is room for improvement.

An object of the invention is to prevent breakage or the like of a diaphragm portion in a pressure sensor and to maintain pressure detection sensitivity.

Solution to Problem

A pressure sensor according to the invention includes: a sensor housing having an opening portion having different dimensions in a longitudinal direction and a transverse direction; a sensor chip that is provided on the sensor housing in a manner of closing the opening portion and that forms a diaphragm portion; a strain gauge portion provided in the sensor chip; and a cap member bonded to the sensor chip by a cap bonding agent, in which among bonding surfaces of the cap bonding agent, bonding surfaces at both longitudinal direction end portions of the diaphragm portion each have a bonding area larger than that of bonding surfaces at both transverse direction end portions of the diaphragm portion.

Advantageous Effects of Invention

According to the invention, it is possible to prevent breakage or the like of a diaphragm portion in a pressure sensor and to maintain pressure detection sensitivity.

BRIEF DESCRIPTION OF DRAWINGS

FIG. 1 is a schematic configuration diagram showing a dispensing apparatus including a pressure sensor.

FIG. 2 is an enlarged view showing an arm 16 and the like in FIG. 1.

FIG. 3A is an exploded perspective view showing a pressure sensor according to a first embodiment.

FIG. 3B is a vertical cross-sectional view showing the pressure sensor in FIG. 3A.

FIG. 4 is an exploded perspective view showing a sensor chip portion of the pressure sensor in FIG. 3B.

FIG. 5A is a vertical cross-sectional view showing a deformed state (longitudinal direction) during use of a pressure sensor in the related art.

FIG. 5B is a vertical cross-sectional view of the pressure sensor in FIG. 5A as viewed along a transverse direction.

FIG. 6A is a vertical cross-sectional view showing a deformed state (longitudinal direction) during use of the pressure sensor according to the first embodiment.

FIG. 6B is a vertical cross-sectional view of the pressure sensor in FIG. 6A as viewed along the transverse direction.

FIG. 7 is a perspective view showing a sensor chip portion of a pressure sensor according to a second embodiment.

FIG. 8 is a perspective view showing a sensor chip portion of a pressure sensor according to a third embodiment.

FIG. 9 is a top view showing a modification of a cap member of the pressure sensor.

FIG. 10 is a top view showing another modification of the cap member of the pressure sensor.

DESCRIPTION OF EMBODIMENTS

The present disclosure relates to a pressure sensor, and particularly to a pressure sensor suitably used for detecting a pressure of a fluid, such as in a dispensing apparatus.

The pressure sensor according to the disclosure is configured such that a deformation-restraining effect on a sensor chip by a cap member strongly acts along a longitudinal direction of a diaphragm portion and weakly acts in a transverse direction. In other words, the pressure sensor according to the disclosure has a configuration that is unlikely to deform in the longitudinal direction of the diaphragm portion and is likely to deform in the transverse direction.

Hereinafter, embodiments in which the pressure sensor according to the disclosure is applied to a dispensing apparatus will be described.

First Embodiment

FIG. 1 is a schematic configuration diagram showing a dispensing apparatus including a pressure sensor.

As shown in this figure, a flow path system of a dispensing apparatus 1 includes a nozzle 2, a syringe pump 4, an electromagnetic valve 5, a gear pump 6, and a water tank 7, and the components are connected by a pipe 8. The syringe pump 4 includes a container 9, a plunger 10, a ball screw 11, and a drive motor 12. The dispensing apparatus 1 also includes an arm 16 (dispensing arm). The drive motor 12 is controlled by a control unit 14 in the same manner as a motor that drives a sample dispensing mechanism 13 and the like.

A pressure sensor 15 is provided in the arm 16. The arm 16 can perform a rotation operation and an up-down movement operation in order to move to a position where a liquid is suctioned or discharged.

FIG. 2 is an enlarged view showing the arm 16 and the like in FIG. 1.

FIG. 2 shows a state immediately after water 21 for syringe pressure transmission is suctioned into the pipe 8. The pipe 8 is filled with the water 21. A liquid 22 is introduced into the nozzle 2.

Dividing air 23 is introduced between the water 21 and the liquid 22. The water 21 reaches a position of the pressure sensor 15.

By pressurizing the water 21 by the syringe pump 4 (FIG. 1), a pressure can be transmitted to the liquid 22, and the liquid 22 can be suctioned or discharged from the nozzle 2.

When the liquid 22 is suctioned from the nozzle 2, the plunger 10 in the syringe pump 4 is pulled while the electromagnetic valve 5 (FIG. 1) is in a closed state. On the other hand, when the liquid is discharged from the nozzle 2, the plunger 10 in the syringe pump 4 is pushed into the container 9 while the electromagnetic valve 5 is in a closed state.

When suctioning the liquid 22 such as a sample, the liquid 22 is suctioned after suctioning, by the nozzle 2, the dividing air 23 for dividing such that the liquid 22 is not mixed with the water 21 in the pipe 8.

After the discharge, the nozzle 2 is washed. During the washing of the nozzle 2, the water 21 in the flow path is pushed out simultaneously with application of washing water to an outer wall of the nozzle 2. In order to push out the water 21 in the nozzle 2 during the washing, the electromagnetic valve 5 is opened and a pressure of the gear pump 6 is used, so that the water 21 can be sent out at a higher pressure than when pushing with the syringe pump 4.

The pressure sensor 15 is provided on the pipe 8 in order to detect an abnormality such as clogging or air suction of the nozzle 2, which may occur during a dispensing operation. The pressure sensor 15 monitors a pressure of the water 21 and detects an abnormal pressure change.

The pressure sensor 15 is preferably disposed at a position close to the nozzle 2 in order to reliably detect a pressure change in the nozzle 2. Therefore, in this figure, the pressure sensor 15 is provided in the arm 16. However, a position where the pressure sensor 15 is provided is not limited to the inside of the arm 16, and may be, for example, a side surface portion of the sample dispensing mechanism 13.

Next, a structure of the pressure sensor according to the disclosure will be described in more detail.

FIG. 3A is an exploded perspective view showing an example of the pressure sensor in FIG. 2.

FIG. 3B is a vertical cross-sectional view showing the pressure sensor in FIG. 3A.

As shown in FIG. 3A, the pressure sensor 15 includes a sensor chip 31, a cap member 34 (cover member), a sensor housing 32, and a cover 40. A flow path 33 is formed inside the sensor housing 32. Screw portions (not shown) are provided at both end portions of the flow path 33, and the flow path 33 can be connected to the pipe 8 of the dispensing apparatus 1 via a joint.

An opening portion 35 is provided in the sensor housing 32. The opening portion 35 communicates with the flow path 33. The opening portion 35 reaches an outer surface portion of the sensor housing 32. In other words, the opening portion 35 is configured to be branched from the flow path 33 toward the outer surface portion of the sensor housing 32 and reach the outer surface portion of the sensor housing 32.

The sensor chip 31 is disposed at a terminal end portion of the opening portion 35 located in the outer surface portion of the sensor housing 32 in a manner of closing the opening portion 35. The sensor chip 31 is bonded to the sensor housing 32 by a sensor chip bonding agent 36. In other words, a sensor chip bonding portion constituted by the sensor chip bonding agent 36 is provided between the sensor chip 31 and the sensor housing 32. The cap member 34 is bonded to a surface of the sensor chip 31. In order to extract an output from the sensor chip 31, a printed circuit board 45 is provided on the sensor housing 32. The printed circuit board 45 is electrically connected to an electrode portion of the sensor chip 31 by a bonding wire 46. The printed circuit board 45 is a glass epoxy board, a flexible printed circuit board, or the like.

As shown in FIG. 3B, the sensor chip 31 includes a diaphragm portion 31*a* that is a deformed portion thereof. The cap member 34 (cover member) that protects the diaphragm portion 31*a* is bonded to the surface of the sensor chip 31. The cover 40 is provided on the outer surface portion of the sensor housing 32 to cover the sensor chip 31. The cover 40 is fixed by adhesion, screwing, snap fitting, or the like.

The diaphragm portion 31*a* is bent and deformed due to a pressure change of the water 21 flowing through the flow path 33. Strain at that time is measured by the sensor chip 31, and thus the pressure of the water 21 flowing in the sensor housing 32 is measured. The strain is measured by a strain gauge mounted on a surface of a central portion of the sensor chip 31.

FIG. 4 is an exploded perspective view showing a sensor chip portion of the pressure sensor in FIG. 3B.

In this figure, the sensor chip 31 is bonded to the terminal end portion of the opening portion 35 by the sensor chip bonding agent 36. A portion of the sensor chip 31 facing the opening portion 35 is the diaphragm portion 31*a* of the pressure sensor 15. The opening portion 35 and the diaphragm portion 31*a* are oval and have different dimensions in a longitudinal direction and a transverse direction. The shape of each of the opening portion 35 and the diaphragm portion 31*a* is not limited to the oval shape, and may be an elliptical shape, a rectangular shape with curved corner portions, or the like.

The cap member 34 is bonded to the surface of the sensor chip 31 by a longitudinal direction both end vicinity bonding agent 37*a* and a transverse direction both end vicinity bonding agent 37*b*. In other words, between the sensor chip 31 and the cap member 34, a bonding portion (cap bonding portion) is provided, which includes the longitudinal direction both end vicinity bonding agent 37*a* and the transverse direction both end vicinity bonding agent 37*b*. Here, the vicinity of both ends may be rephrased as "both end portions". Therefore, the longitudinal direction both end vicinity bonding agent 37*a* is a bonding agent provided at both longitudinal direction end portions, and the transverse direction both end vicinity bonding agent 37*b* is a bonding agent provided at both transverse direction end portions.

A bonding surface of the longitudinal direction both end vicinity bonding agent 37*a* is a longitudinal direction both end vicinity bonding surface 38*a*, and a bonding surface of the transverse direction both end vicinity bonding agent 37*b* is a transverse direction both end vicinity bonding surface 38*b*. Each of the longitudinal direction both end vicinity bonding agent 37*a* and the transverse direction both end vicinity bonding agent 37*b* is a thermosetting adhesive, a UV addition adhesive, a low-melting-point glass, a silver paste, or the like. A strain gauge portion 31*b* for detecting strain is provided at a central portion of the surface of the sensor chip 31.

In the embodiment, bonding agents having the same storage elastic modulus are used as the longitudinal direction both end vicinity bonding agent 37*a* and the transverse direction both end vicinity bonding agent 37*b*.

When the diaphragm portion 31*a* receives a pressure from the water 21 and is deformed, there is a difference in magnitude of strain in the diaphragm portion 31*a* between a longitudinal direction and a transverse direction of the strain gauge portion 31*b*.

The strain gauge portion 31*b* detects the strain in each of the longitudinal direction and the transverse direction, and outputs the difference therebetween. This is to offset temperature characteristics of the strain gauge portion 31*b*.

Under a condition that sensor sensitivity is to be increased in the pressure sensor 15 of such a type, it is important that an absolute value of the strain in the strain gauge portion 31*b* is large and the difference in the strain between the longitudinal direction and the transverse direction is large. In order to increase the absolute value of the strain, it is effective to reduce a thickness of the sensor chip 31 to facilitate deformation. However, as a drawback of thickness reduction, strength of the sensor chip 31 decreases, and there is a concern that handling performance at the time of manufacturing may decrease, a chip fracture may occur, and the like. In the embodiment, in order to solve this problem, the cap member 34 is bonded to the sensor chip 31 to ensure strength.

However, as will be described later, when the cap member 34 is bonded, rigidity of the diaphragm portion 31*a* also increases, the absolute value of the strain in the strain gauge portion 31*b* decreases, and thus the sensor sensitivity decreases.

In order to solve this problem, among the bonding surfaces of the cap member 34, a bonding area of the longitudinal direction both end vicinity bonding surface 38*a* is larger than that of the transverse direction both end vicinity bonding surface 38*b*.

Next, effects of the configuration in FIG. 4 will be described with reference to FIGS. 5A to 6B. These figures each show a vertical cross-section passing through the strain gauge portion 31*b*.

FIG. 5A is a vertical cross-sectional view showing a deformed state (longitudinal direction) during use of a pressure sensor in the related art.

FIG. 5B is a vertical cross-sectional view of the pressure sensor in FIG. 5A as viewed along the transverse direction.

Since no cap member is attached to the pressure sensor shown in these figures, the sensor chip 31 is largely deformed upon receiving a pressure p from the water 21 (FIG. 3B).

When the sensor chip 31 receives the pressure p and is deformed, tensile strain is generated in the strain gauge portion 31*b*. Among the tensile strain, a longitudinal direction component is denoted by $\varepsilon x1$ and a transverse direction component is denoted by $\varepsilon y1$ in the figures.

The difference in dimension of the opening portion 35 between the longitudinal direction and the transverse direction causes a difference in curvature of the strain gauge portion 31*b*. Specifically, a curvature in the transverse direction is larger than that in the longitudinal direction, and $\varepsilon x1 < \varepsilon y1$ is satisfied when expressed in terms of a tensile strain magnitude relationship. As a sensor output, a difference $\varepsilon y1 - \varepsilon x1$ therebetween is output.

Due to such deformation, a portion of the sensor chip 31 bonded by the sensor chip bonding agent 36 is displaced inward in each of the longitudinal direction and the transverse direction (in the figures, directions from the left and the right to the center). Due to such displacement, the sensor chip bonding agent 36 receives a shear force from the sensor chip 31 and is in a state of shear deformation.

FIG. 6A is a vertical cross-sectional view showing a deformed state (longitudinal direction) during use of the pressure sensor according to the embodiment.

FIG. 6B is a vertical cross-sectional view of the pressure sensor in FIG. 6A as viewed along the transverse direction.

In the pressure sensor shown in these figures, since the cap member 34 is attached, even when the sensor chip 31 receives the pressure p from the water 21 (FIG. 3B), a deformation amount is smaller than that in the example of the related art shown in FIGS. 5A and 5B.

As shown in FIGS. 6A and 6B, among the tensile strain, a longitudinal direction component is denoted by $\varepsilon x2$, and a transverse direction component is denoted by $\varepsilon y2$. In this case, the sensor output is $\varepsilon y2 - \varepsilon x2$.

In the embodiment, the tensile strain is restrained by rigidity of the cap member 34. As shown in FIGS. 6A and 6B, the sensor chip bonding agent 36, the longitudinal direction both end vicinity bonding agent 37*a*, and the transverse direction both end vicinity bonding agent 37*b* receive a shear force from the sensor chip 31 and are in a state of shear deformation. Due to a deformation-restraining effect of the cap member 34, $\varepsilon x2$ and $\varepsilon y2$ are both smaller than those in the case where the cap member 34 is not attached. This causes a decrease in sensitivity due to the attachment of the cap member 34.

In order to prevent this decrease in sensitivity, in the embodiment, as shown in FIG. 4, the bonding area of the longitudinal direction both end vicinity bonding surface 38*a* is configured to be larger than that of the transverse direction both end vicinity bonding surface 38*b*. Accordingly, there is a difference in ease of shear deformation between the longitudinal direction both end vicinity bonding agent 37*a* and the transverse direction both end vicinity bonding agent 37*b*, and the transverse direction both end vicinity bonding agent 37*b* is more susceptible to shear deformation. That is, the deformation-restraining effect on the sensor chip 31 by the cap member 34 is relatively strong along the longitudinal direction and relatively weak along the transverse direction. As a result, the tensile strain $\varepsilon x2$ of the longitudinal direction component decreases relatively largely whereas a decrease in the tensile strain $\varepsilon y2$ of the transverse direction component is relatively small, and thus the sensor output $\varepsilon y2 - \varepsilon x2$, which is the difference therebetween, can be increased.

In this way, according to the configuration of the embodiment, the strength of the sensor chip 31 can be ensured by the cap member 34, and the sensitivity of the pressure sensor can be maintained.

Although the bonding agents are disposed at positions that are linearly respect to the longitudinal direction and the transverse direction, the positions may not be line-symmetrical, and the same effects are obtained even when the bonding surfaces are changed within a range in which the magnitude relationship of the bonding areas is satisfied. The shape of the cap member 34 is not limited to the shown shape.

In the above-described example, the description is made based on the magnitude of the bonding area, and as a configuration for obtaining the same effects, there is a configuration in which a long axis of the longitudinal direction both end vicinity bonding surface 38*a*, that is, a length of the longitudinal direction both end vicinity bonding surface 38*a* close to the opening portion 35, is longer than a long axis of the transverse direction both end vicinity bonding surface 38*b*, that is, a length of the transverse direction both end vicinity bonding surface 38*b* close to the opening portion 35. This configuration also matches the configuration in FIG. 4. In this case, as shown in FIG. 4, it is assumed that short axes of the longitudinal direction both end vicinity bonding surface 38*a* and the transverse direction both end vicinity bonding surface 38*b* are substantially the same.

Alternatively, the short axes may be different. This is because the deformation-restraining effect by the cap member 34 is affected by a dimension of the long axis more than the short axis among dimensions of the longitudinal direction both end vicinity bonding surface 38*a* and the transverse direction both end vicinity bonding surface 38*b*.

Second Embodiment

FIG. 7 is a perspective view showing a sensor chip portion of a pressure sensor according to a second embodiment.

In a pressure sensor 75 shown in this figure, the cap member 34 and the sensor chip 31 are bonded to each other by the longitudinal direction both end vicinity bonding agent 37*a* and a transverse direction both end vicinity bonding agent 77*b* having the same shapes as those in the first embodiment.

A feature of the embodiment is that a bonding agent having a smaller storage elastic modulus than that of the longitudinal direction both end vicinity bonding agent 37*a* is selected as the transverse direction both end vicinity bonding agent 77*b*. Accordingly, as compared with the case where bonding agents having the same storage elastic modulus are used as in the first embodiment, the deformation-restraining effect on the sensor chip 31 by the cap member 34 in the transverse direction can be further reduced. Therefore, a decrease in the tensile strain $\varepsilon y2$ of the transverse direction component is further reduced, and the sensor output $\varepsilon y2-\varepsilon x2$ can be increased.

The configuration of the embodiment is effective, for example, when it is desired to maximize a bonding area of the cap member 34 and to increase the sensor sensitivity. A purpose of increasing the bonding area of the cap member 34 is to ensure bonding strength and prevent resonance due to external vibration.

Third Embodiment

FIG. 8 is a perspective view showing a sensor chip portion of a pressure sensor according to a third embodiment.

In a pressure sensor 85 shown in this figure, unlike the first embodiment, the cap member 34 and the sensor chip 31 are bonded to each other by the longitudinal direction both end vicinity bonding agent 37*a*. No bonding agent is provided in the vicinity of both ends in the transverse direction. This corresponds to a case where the area (bonding area) of the transverse direction both end vicinity bonding surface 38*b* is 0 in the first embodiment.

Accordingly, the deformation-restraining effect on the sensor chip 31 by the cap member 34 in the transverse direction is minimized. Therefore, a decrease in the tensile strain $\varepsilon y2$ of the transverse direction component is minimized, and the sensor output $\varepsilon y2-\varepsilon x2$ can be increased. Since the number of bonding portions is reduced, it is possible to shorten a step of applying an adhesive by a dispenser in a manufacturing step.

(Modification)

FIG. 9 is a top view showing a modification of the cap member.

In this figure, one rib 94 is provided in the longitudinal direction of the cap member 34. In other words, the cap member 34 includes one rib 94 provided along the longitudinal direction of the opening portion 35.

With this configuration, the rigidity of the cap member 34 in the longitudinal direction can be increased, and deformation of the cap member 34 in the longitudinal direction can be restrained. Accordingly, a decrease in the tensile strain $\varepsilon x2$ in the longitudinal direction can be restrained.

FIG. 10 is a top view showing another modification of the cap member.

In this figure, three ribs 94 are provided in the longitudinal direction of the cap member 34.

With this configuration, the rigidity of the cap member 34 in the longitudinal direction can be further increased, and the deformation of the cap member 34 in the longitudinal direction can be further restrained. Accordingly, the decrease in the tensile strain $\varepsilon x2$ in the longitudinal direction can be further restrained.

The invention is not limited to the above-described embodiments, and includes various modifications. The embodiments described above are described in detail to facilitate understanding of the invention, and the invention is not necessarily limited to those including all the described configurations. A part of the configuration of one embodiment can be replaced with the configuration of another embodiment. It is also possible to add the configuration of another embodiment to the configuration of a certain embodiment. A part of the configuration of each embodiment may be added to, deleted from, or replaced with another configuration.

REFERENCE SIGNS LIST

- 1: dispensing apparatus
- 2: nozzle
- 4: syringe pump
- 5: electromagnetic valve
- 6: gear pump
- 7: water tank
- 8: pipe
- 9: container
- 10: plunger
- 11: ball screw
- 12: drive motor
- 13: sample dispensing mechanism
- 14: control unit
- 15: pressure sensor
- 16: arm
- 21: water
- 22: liquid
- 23: dividing air

31: sensor chip
31*a*: diaphragm portion
31*b*: strain gauge portion
32: sensor housing
33: flow path
34: cap member
35: opening portion
36: sensor chip bonding agent
37*a*: longitudinal direction both end vicinity bonding agent
37*b*: transverse direction both end vicinity bonding agent
38*a*: longitudinal direction both end vicinity bonding surface
38*b*: transverse direction both end vicinity bonding surface
40: cover
45: printed circuit board
46: bonding wire

The invention claimed is:

1. A pressure sensor comprising:

a sensor housing having an opening portion having different dimensions in a longitudinal direction and a transverse direction;

a sensor chip that is provided on the sensor housing in a manner of closing the opening portion and that forms a diaphragm portion;

a strain gauge portion provided in the sensor chip; and a cap member bonded to the sensor chip by a cap bonding agent, wherein among bonding surfaces of the cap bonding agent, bonding surfaces at both longitudinal direction end portions of the diaphragm portion each have a bonding area larger than that of bonding surfaces at both transverse direction end portions of the diaphragm portion.

2. A pressure sensor comprising:

a sensor housing having an opening portion having different dimensions in a longitudinal direction and a transverse direction;

a sensor chip that is provided on the sensor housing in a manner of closing the opening portion and that forms a diaphragm portion;

a strain gauge portion provided in the sensor chip; and a cap member bonded to the sensor chip by a cap bonding agent, wherein among bonding surfaces of the cap bonding agent, a long axis of bonding surfaces at both longitudinal direction end portions of the diaphragm portion is longer than a long axis of bonding surfaces at both transverse direction end portions of the diaphragm portion.

3. A pressure sensor comprising:

a sensor housing having an opening portion having different dimensions in a longitudinal direction and a transverse direction;

a sensor chip that is provided on the sensor housing in a manner of closing the opening portion and that forms a diaphragm portion;

a strain gauge portion provided in the sensor chip; and a cap member bonded to the sensor chip by a cap bonding agent, wherein the cap member includes a rib provided along the longitudinal direction of the opening portion.

4. The pressure sensor according to claim 1, wherein among the cap bonding agent, the cap bonding agent at the both transverse direction end portions of the diaphragm portion has a smaller storage elastic modulus than the cap bonding agent at the both longitudinal direction end portions of the diaphragm portion.

5. The pressure sensor according to claim 1, wherein the bonding area of the bonding surfaces at the both transverse direction end portions of the diaphragm portion is 0.

* * * * *